United States Patent [19]
Schmidt

[11] 3,814,153
[45] June 4, 1974

[54] APPARATUS FOR PERFORMING A SERIES OF OPERATIONS ON A SUCCESSION OF WOOD WORKPIECES

[75] Inventor: Erich Schmidt, Wien, Austria

[73] Assignee: Maschinenfabrik Zuckermann Komm. Ges., Wien, Austria

[22] Filed: July 24, 1972

[21] Appl. No.: 274,518

[30] Foreign Application Priority Data
July 23, 1971 Austria .............................. 6435/71

[52] U.S. Cl. ................. 144/3 R, 144/134 R, 29/33
[51] Int. Cl. ......................... B27m 3/18, B27c 5/02
[58] Field of Search............. 144/3 R, 134 R; 29/33

[56] References Cited
UNITED STATES PATENTS

| 796,095 | 8/1905 | Wattie | 144/3 R |
|---|---|---|---|
| 2,028,008 | 1/1936 | Peyinghaus | 29/33 P |
| 2,929,421 | 3/1960 | Webb | 144/134 R |
| R25,886 | 10/1965 | Cargill | 29/33 P |
| 3,543,392 | 12/1970 | Perry et al. | 29/33 P |

*Primary Examiner*—Donald R. Schran
*Attorney, Agent, or Firm*—Karl F. Ross; Herbert Dubno

[57] ABSTRACT

A succession of wooden workpieces are each retained on a carriage forming part of a train of carriages pushed stepwise along an upper guide track along which are arranged a plurality of woodworking machines. A workpiece is loaded automatically onto the furthest upstream carriage and prepared as it moves along and is finally removed from its carriage when this carriage reaches the downstream end of the track. The carriage is then turned over and sent upstream to take on a new workpiece. Midway in the working track there is provided an apparatus having two arms each provided with a rotatable head having jaws which grip the workpiece's ends. Then the arms lift and turn the workpiece over and set it back on its carriage so that its other face can be worked on.

11 Claims, 18 Drawing Figures

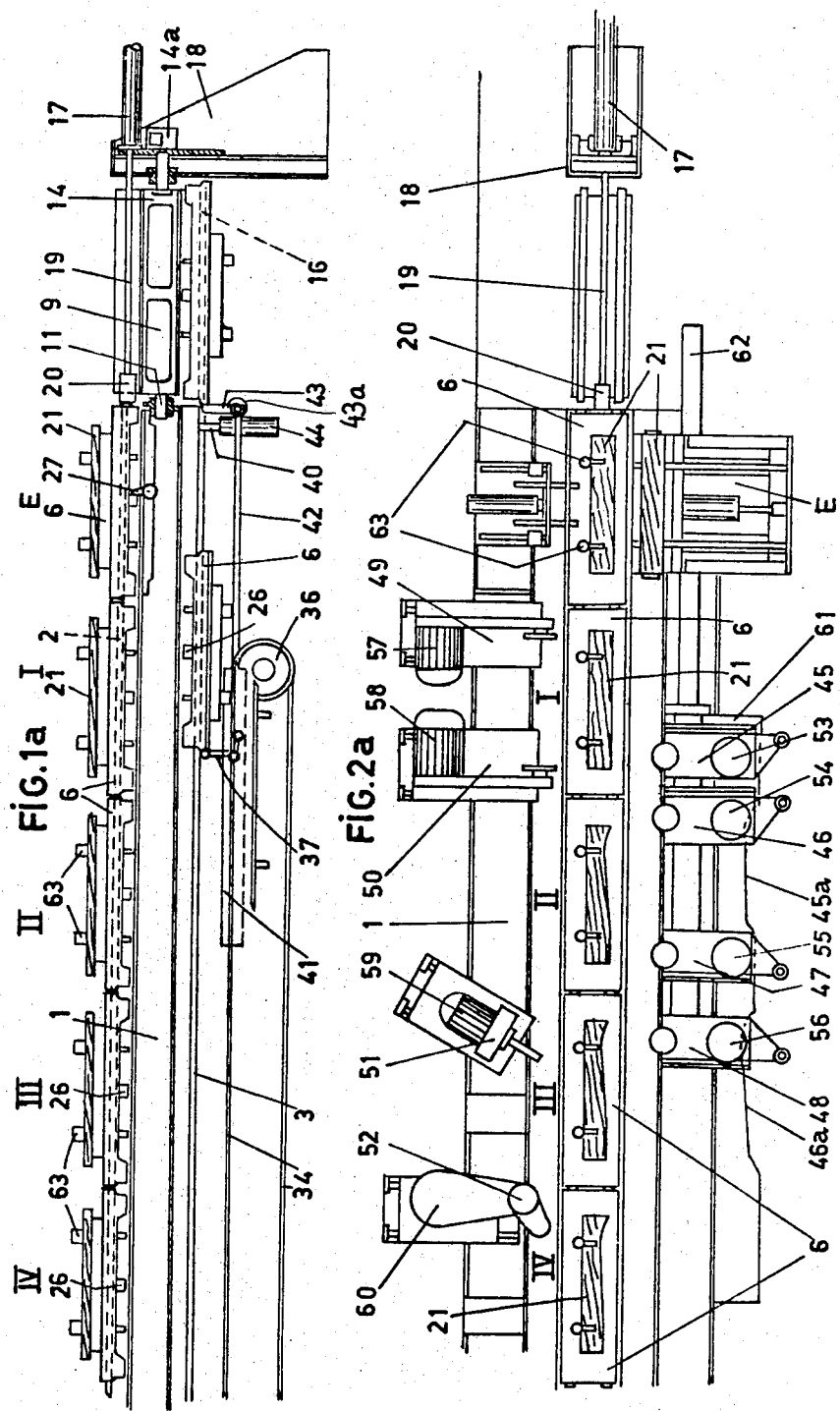

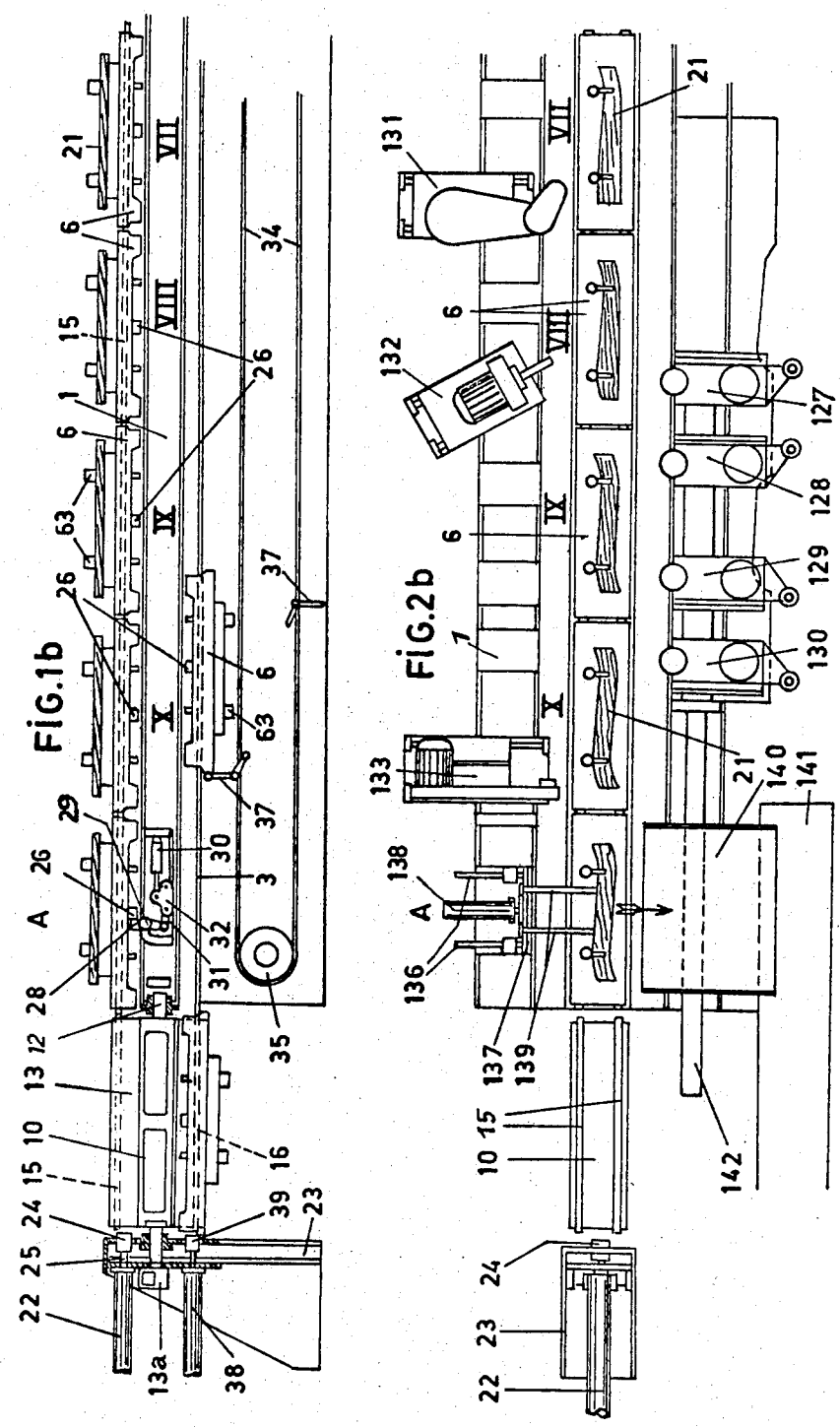

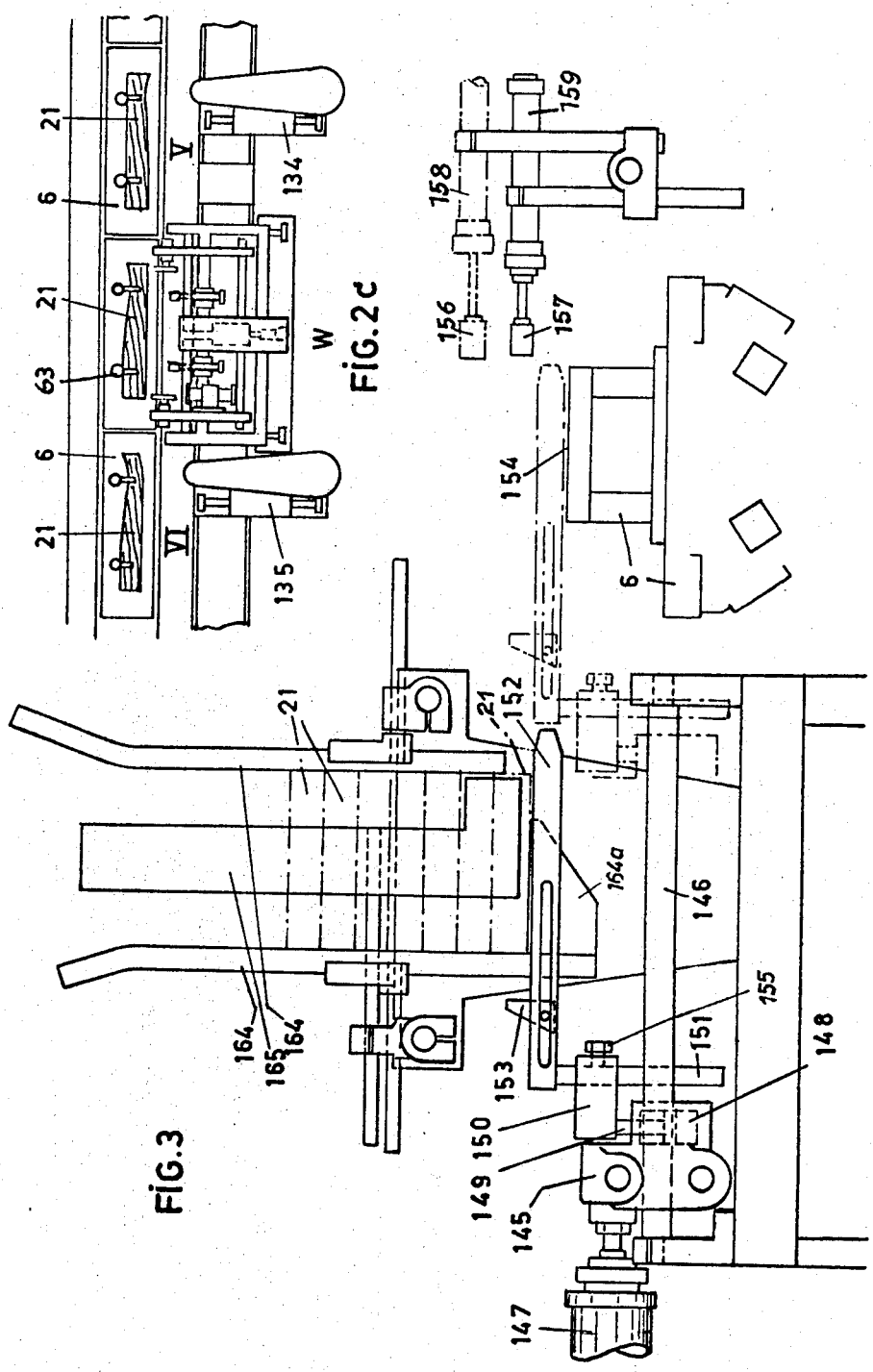

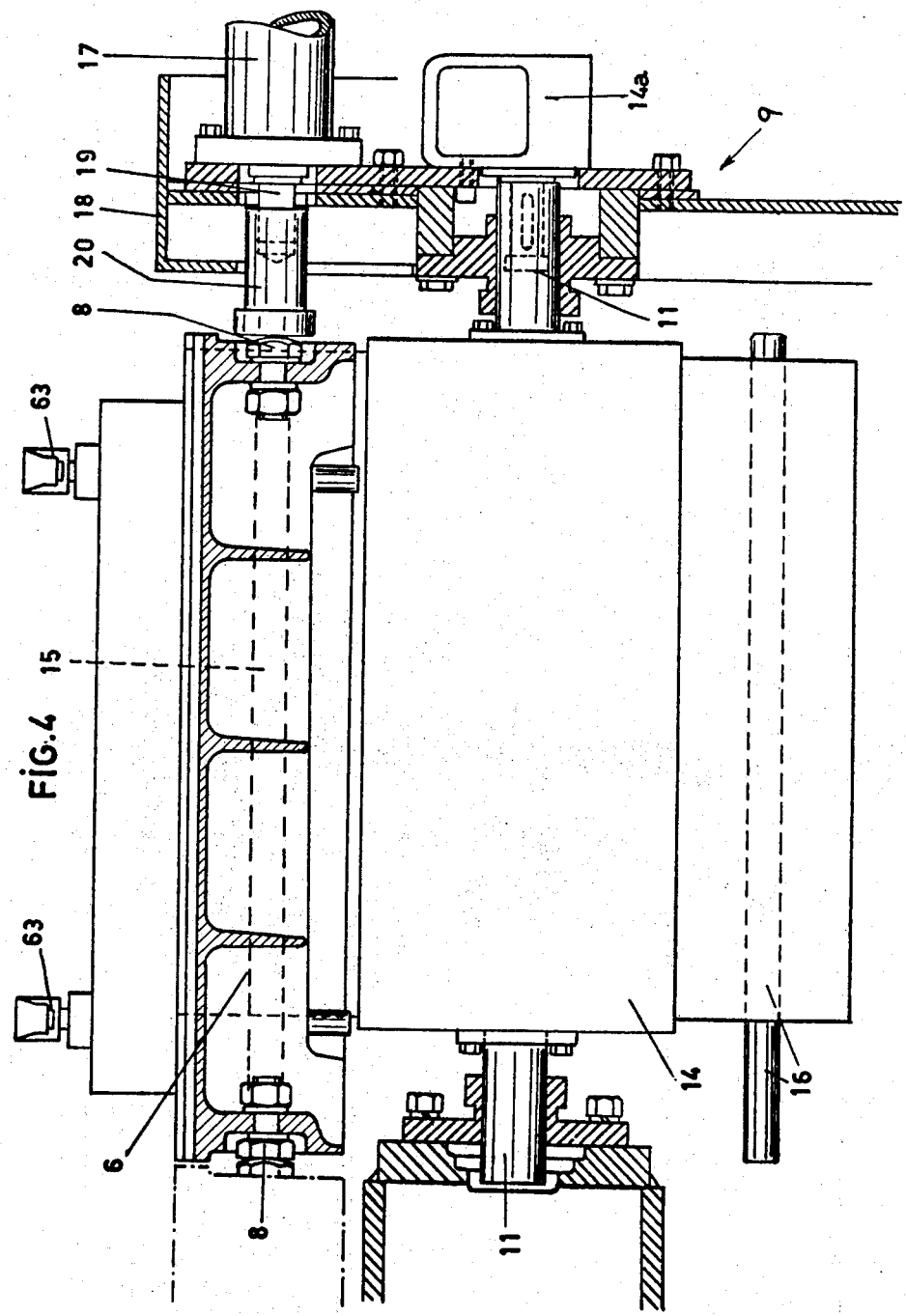

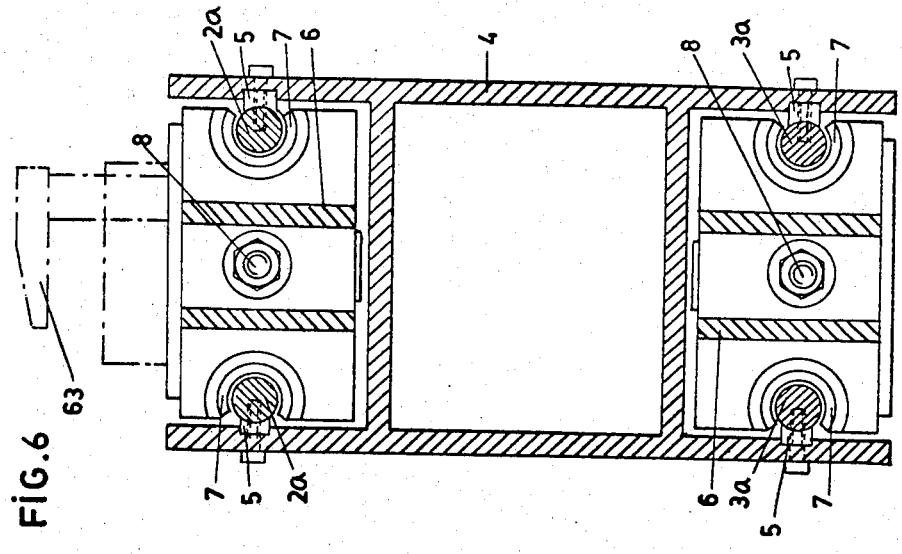
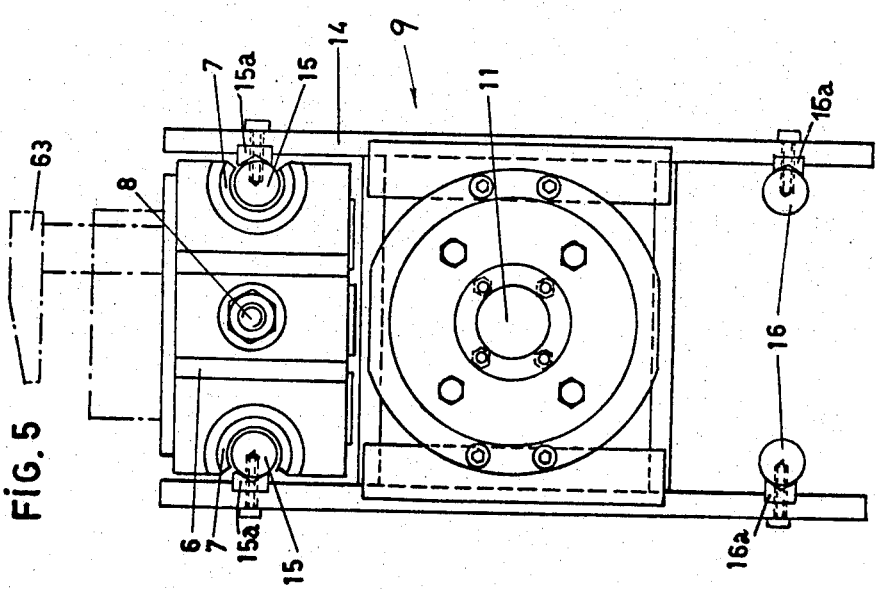

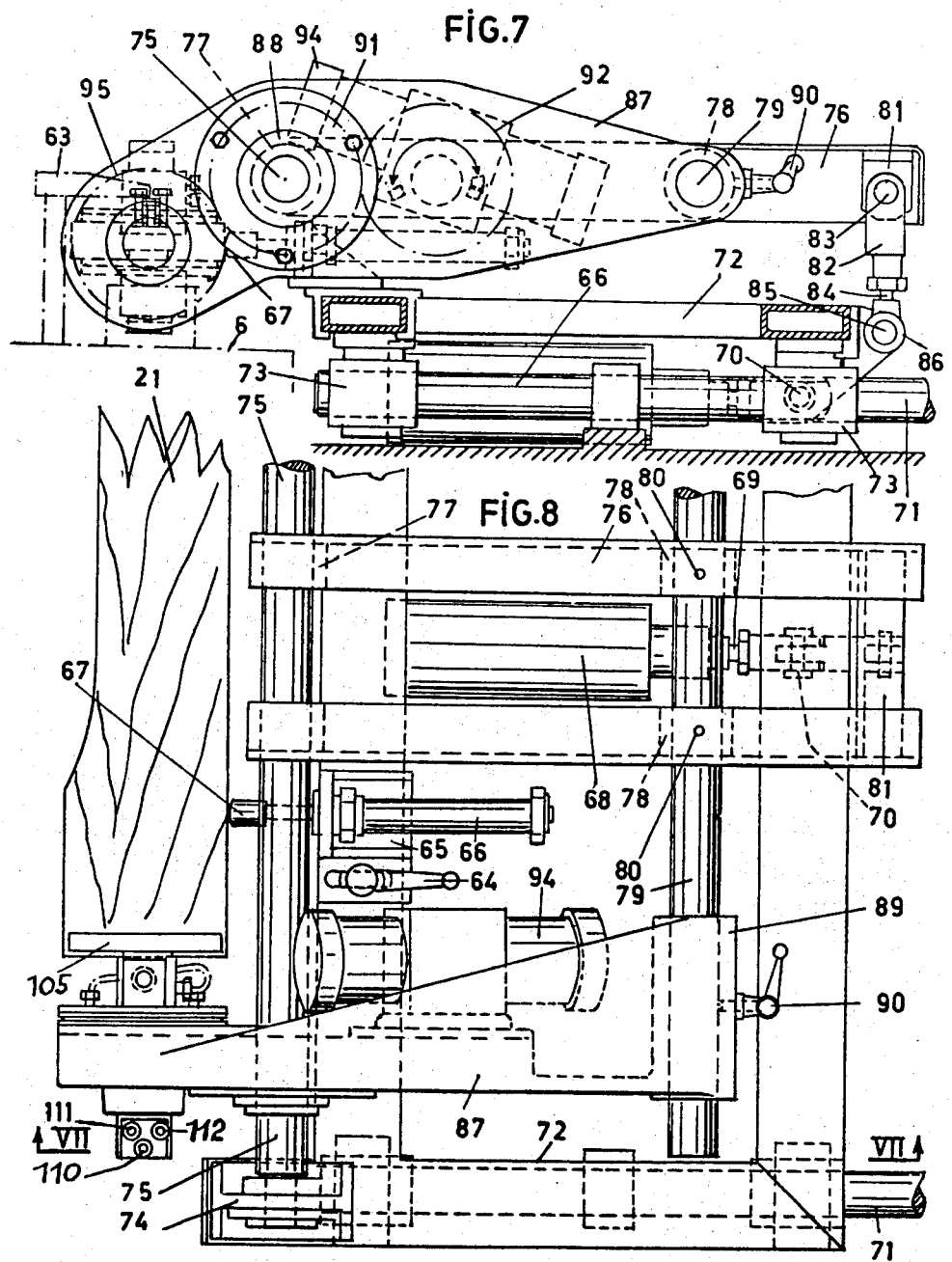

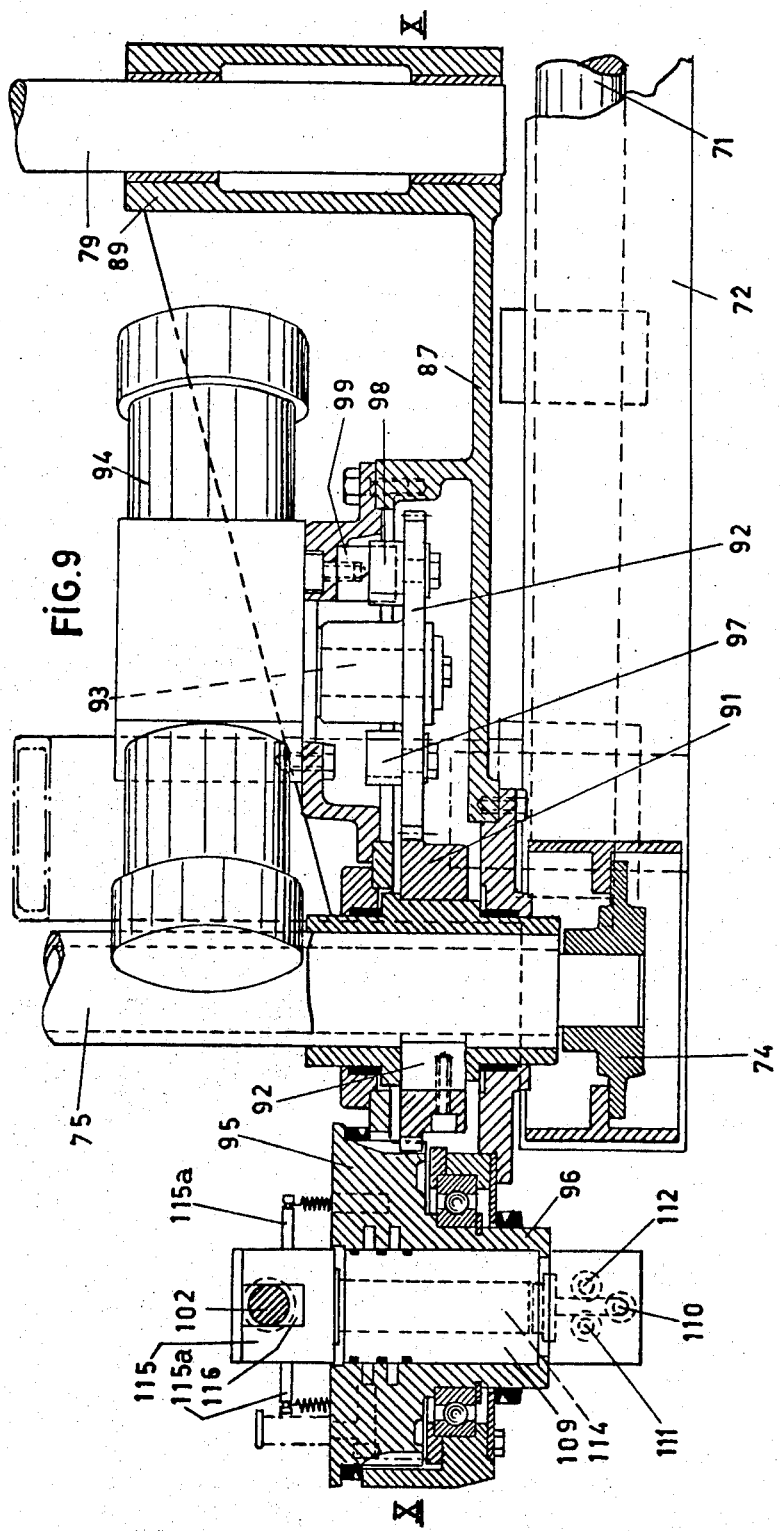

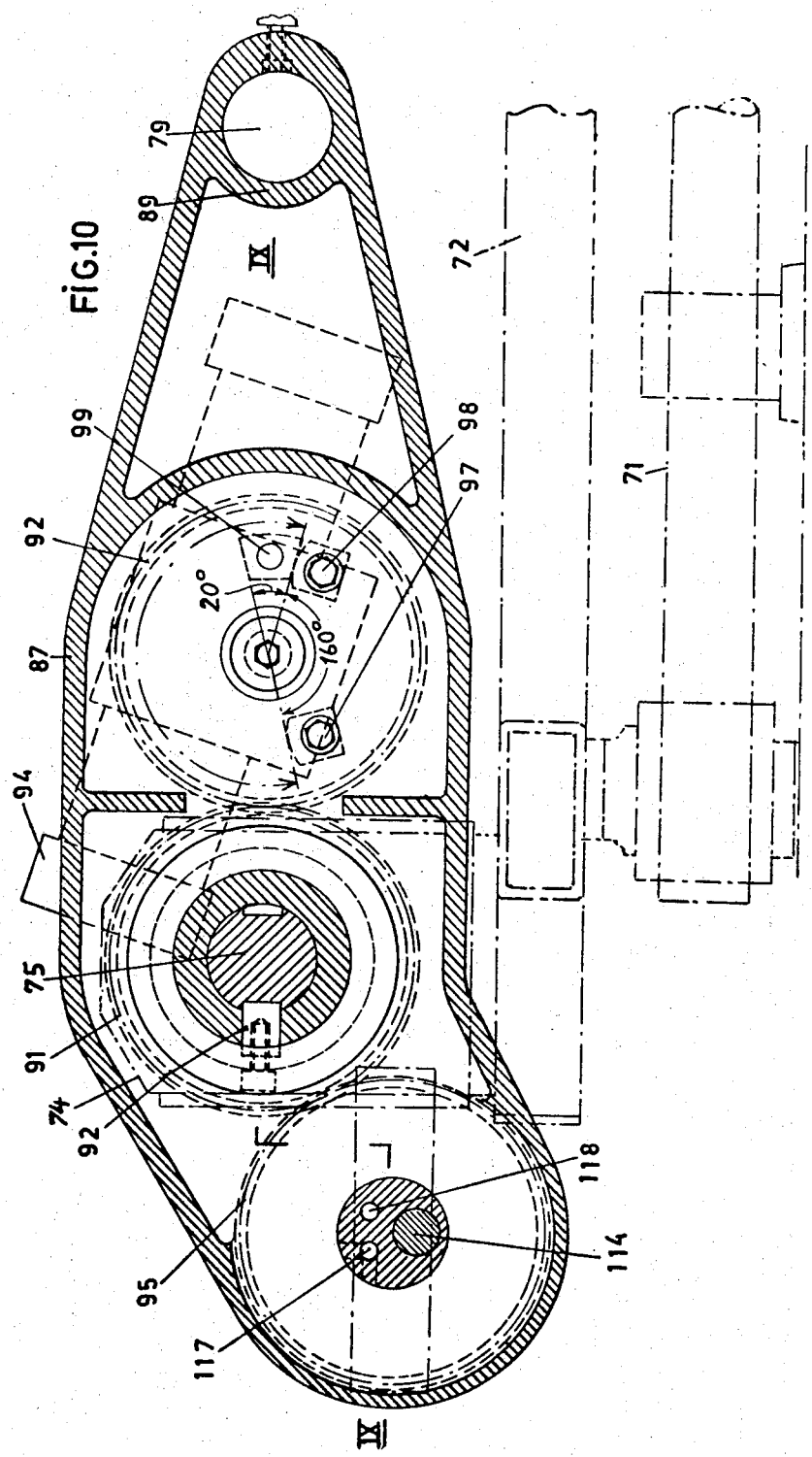

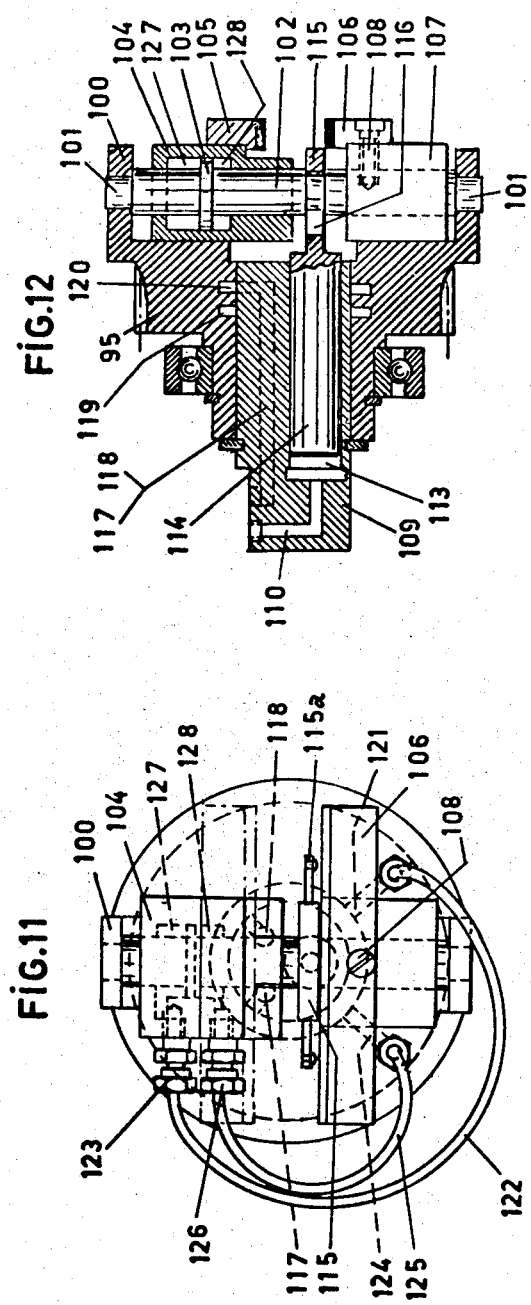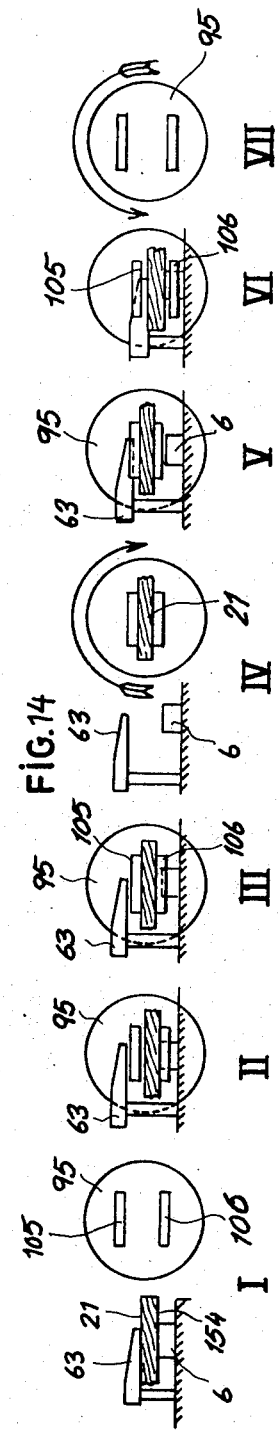

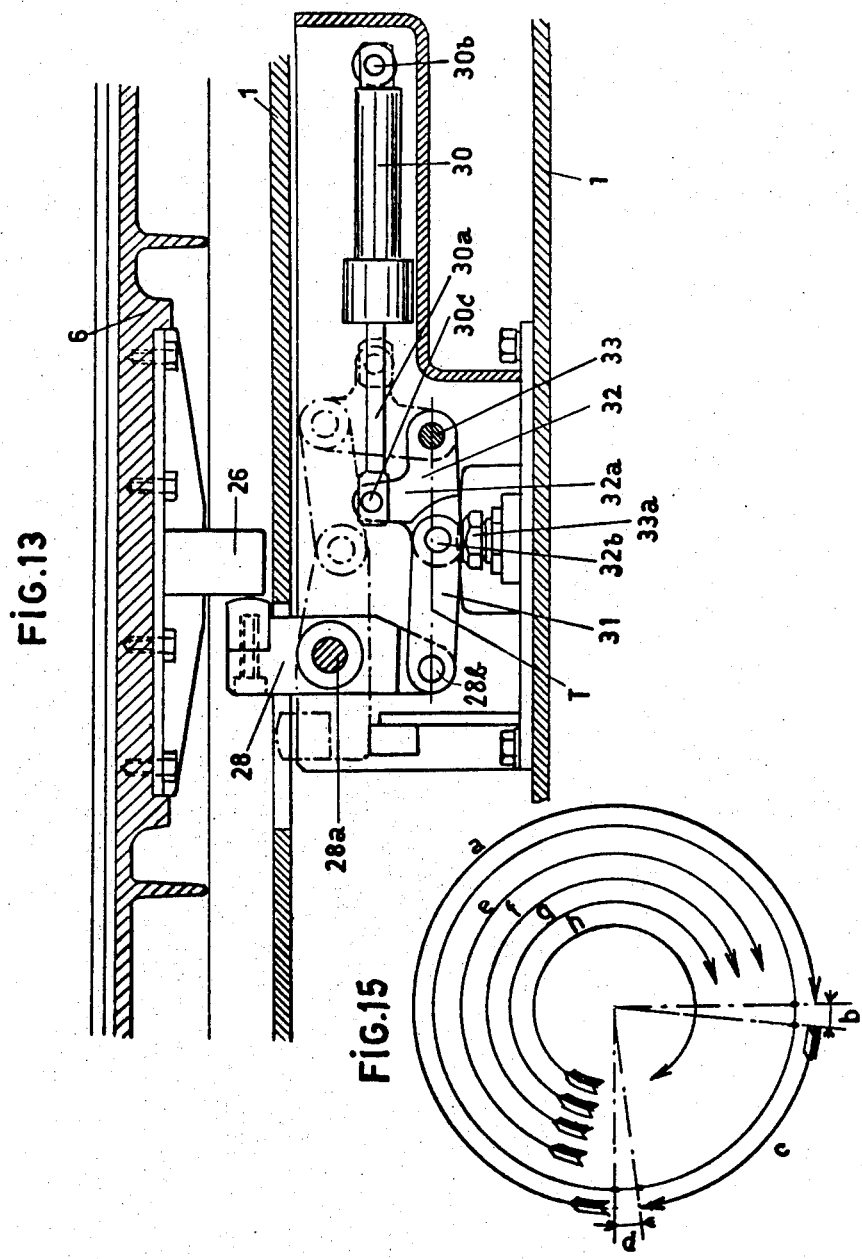

3,814,153

APPARATUS FOR PERFORMING A SERIES OF OPERATIONS ON A SUCCESSION OF WOOD WORKPIECES

SPECIFICATION

1. Field of the Invention

The present invention relates to an apparatus for and method of shaping a workpiece. More specifically this invention concerns an apparatus for the serial production of shaped wooden pieces useable, for instance, in furniture manufacture.

2. Background of the Invention

In the serial production of furniture pieces each workpiece or blank must be shaped and treated in several different manners. These operations can be subdivided into two main categories: longitudinal working and transverse working, relative to a direction of workpiece travel in which the workpiece is usually oriented. For instance, milling machines and sanders usually run longitudinally of the workpiece, while borers and end cutters work transverse to this direction.

As a general rule the workpieces are displaced continuously along a transport path with the longitudinally working machines being fixed and the transverse working machines travelling on carriages along with the workpieces for a short distance. It is extremely difficult to set up and operate such a line since the rate of feed of some of the machines is often inherently greater than that of others so that corresponding adjustments must be made or a lower-quality product must be accepted. It has been considered extremely difficult to make any other type of serial production work.

OBJECTS OF THE INVENTION

It is therefore an object of the present invention to provide an improved method of an apparatus for shaping or similarly working a succession of workpieces, the term "shaping" being used generically to refer to any working operation altering shape or appearance.

Another object is the provision of an apparatus which effects the rapid and efficient shaping of a succession of workpieces which allows each machine along the line to function at the rate to which it is most particularly adapted.

SUMMARY OF THE INVENTION

These objects are attained according to the present invention in an apparatus wherein a train of carriages is displaced stepwise along a working guide or trails along which are arranged a plurality of shaping machines such as borers, sanders, milling machines, and the like. A return guide coextensive with the working guide is arranged thereunder and at both the upstream and downstream ends there is provided an apparatus for removing a carriage from the one end of one guide and thereafter transferring it to the other guide. Each carriage is provided with clamping means for retaining a work-piece, and means is provided for laying a workpiece blank on the carriage at the upstream end of the working guide and for removing a shaped workpiece from the carriage at the downstream end of the working guide.

According to a feature of the present invention each guide track is a pair of parallel round-section rods on which the carriages slide. The means at the ends for transferring carriages from one guide to the other are two pairs of such guide rods spaced apart at the same distance as in the guides and simultaneously registrable with the ends of both guides so that rotation about an axis parallel to the necessarily parallel guide rods can permit a workpiece which is slid off the working guide and onto the upper set of guide rods of the transferring means can be slid off onto the return guide after 180° rotation of the arrangement. This advantageously causes the empty carriage to be returned to the loading or upstream end of the working guide upside down so that any wood shavings or the like are automatically dumped off.

According to another feature of this invention, means is provided along the working guide track to turn over the workpieces as they are stopped alongside it. This means has a pair of arms each provided with a pair of jaws and means for displacing it toward and away from the workpiece and for closing and opening the jaws as well as rotating them through 180°. In this manner the arms are advanced and the jaws are closed to grip the workpiece, then the arms are raised and the jaws are rotated through 180°. Thereafter the arms are lowered, the jaws opened, and the arms withdrawn.

The interval between cycles is determined by the longest individual working step, that amount of time needed for the slowest machine along the line to complete its particular operation, plus sufficient time to displace the carriages. In reality a nominal amount of time is spent displacing the workpieces in comparison to the amount of time spent actually working them. In addition, means is provided for immobilizing the entire train during the actual simultaneous shaping operations with each carriage held rigidly either sandwiched between two other cars or abutting one other car and a stop provided on the machine, which stop is only removed from the carriage's path during displacement of the carriages. This positive immobilization means that extremely accurate preparing of the workpieces is possible, since each workpiece is rigidly held on the bed of an immobilized carriage.

DESCRIPTION OF THE DRAWING

The above and other objects, features, and advantages will become apparent from the following, reference being made to the accompanying drawing in which:

FIGS. 1a and 1b are side views of the apparatus according to the present invention;

FIGS. 2a–2c are top views of the same apparatus;

FIG. 3 is a side view of the arrangement for laying workpiece blanks onto the upstream end of the working guide track;

FIG. 4 is a vertical longitudinal section through arrangement for transferring a carriage from one guide track to the other;

FIG. 5 is a vertical cross section through the arrangement of FIG. 4;

FIG. 6 is a vertical cross section similar to FIG. 5 but taken further upstream through the apparatus;

FIG. 7 is a vertical section through the device for turning over the workpieces;

FIG. 8 is a top view of the device shown in FIG. 7 with line VII—VII showing the cut line for FIG. 7;

FIG. 9 is a horizontal section taken through the device of FIG. 7, in enlarged scale;

FIG. 10 is a section taken along line X—X of FIG. 9 with line IX—IX indicating the cut line for FIG. 9;

FIG. 11 is an end view of the inverting head of the device of FIG. 7;

FIG. 12 is a section taken along line XII—XII of FIG. 11;

FIG. 13 is a vertical longitudinal section taken through the apparatus showing the end stop;

FIG. 14 is a schematic view illustrating the method of turning over the workpieces according to the present invention; and FIG. 15 is a diagram illustrating the operation cycle of the apparatus.

SPECIFIC DESCRIPTION

The apparatus according to the present invention has an elongated frame 1 extending from an input or charging station E at its upstream end to an unloading or output station A at its downstream end. Ten different working or shaping stations I–X are provided along the frame 1, with an inverting apparatus W being provided at its center (see FIG. 2c) between working stations V and VI.

The frame 1 comprises an upper working guide track 2 supported on a heavy support beam 4 which also carries a parallel return track 3 lying in a plane below the working track 2. A train of carriages 6 travels from input E to output A on the upper track 2 and in the opposite direction on the track 3. On track 2 the carriages abut one another snugly but on track 3 they are not in direct end-on-end contact with one another. Each carriage 6 is provided at its ends with bumpers 8 for pushing and being pushed by the carriages in front and in back.

As shown in FIGS. 4, 5, and 6 each carriage is stoutly made as a heavily ribbed casting provided with bushings 7 that ride on the parallel horizontal rods 2a that constitute the track 2. Each rod 2a is screwed via a spacer 5 to the flanges of the support beam 4, as is each rod 3a of the track 3. These bushings 7 embrace around a major arc, over 180°, of the rods 2a and 3a, here 270°, so that an extremely firm mounting of the carriage is obtained.

Provided at the downstream end of the working track 2 is a transfer and inverting device 10 and a similar device 9 is provided at the upstream end. The device 10 serves to take a single carriage off the track 2, turn it over, and place it on the track 3 while the device 9 transfers a carriage from the track 3 to the track 2. FIGS. 4 and 5 show the construction of the device 9, being understood that device 10 is substantially identical. The devices 9 and 10 have carriers 13 and 14 rotatable about respective axes 11 and 12 parallel to the track rods 2a and 3a and equispaced therebetween on respective stands 18 and 23. More particularly, the device 9 has a pair of upper rods 15 and lower rods 16 which register with the rods 2a and 3a. The upper rods 15 are bolted to the upper flanges of the carrier 14 with interposition of spacers 15a and the lower rods 16 are bolted with spacers 16a. Motors 14a and 15a of the so called Kuaxrotor type are provided to rotate the bodies 13 and 14 so that a carriage 6 which has ridden from one of the tracks 2 or 3 onto one of the sets of rods 15 or 16 can then be aligned with the other track and slid off thereon. Of course the carriage 6 is always empty at this point, the inversion at the downstream device 10 serving to dump any sawdust or shavings off the carriage's bed.

In order to maintain the train 6 of carriages in tight contact with one another an advancing cylinder 17 is provided at the upstream end of the device mounted on the stand 18 for the upstream transferres 9. This cylinder 17 can be hydraulic but is advantageously operated by compressed air so that the bumper 20 carried on its piston rod 19 can engage the bumper 8 of a carriage on the transferres and push it off onto the working track 2, simultaneously advancing all of the carriages 6 by a distance equal to the longitudinal length of one carriage. The bumper 20 advances with a progressively increasing acceleration in the space between two working periods, as will be described below. Another fluid-operated cylinder 22 is provided on the stand 23 at the downstream end of the frame 1. The bumper 24 on the piston rod 25 of this cylinder (FIG. 1b) is engageable with the bumper 8 on the downstream face of the furthest downstream carriage 6. This cylinder 23 is pressurized to resist advance of the carriage train by the cylinder 17 so that a slow and uniform acceleration and subsequent deceleration of the carriages is obtained.

FIGS. 1a and 13 show devices provided at the upstream and downstream ends of the track 2 to hold the train of carriages in place as the piston rods 19 and 25 are withdrawn so that the units 9 and 10 may rotate through 180° to bring a new carriage down or up. To this end each carriage 6 is provided in the middle of its underside with an abutment 26 of heavy construction. At the upstream end a stop 27 which can, as seen in FIG. 1a, only pivot in the counterclockwise direction from the illustrated position, to which it is returned by a spring, engages against the upstream face of the abutment 26 of a carriage which has been pushed past it so that this carriage cannot be displaced back upstream. At the downstream end the more complicated arrangement shown in FIG. 13 is provided which basically comprises a pivotal stop 28 engageable against the downstream face of the abutment 26 of the furthest downstream carriage 6 on the track 2. This lever 28 is pivoted at 21a and is connected through two elements 31 and 32 to a fluid-operated cylinder 30. The element 31 is a simple link pivoted at one end at 28b on one arm of the two-arm lever 28 whose other arm is engageable with the abutment 26 and it is pivoted at the other end at 32b on a simple third-class lever 32 itself pivoted at 33 and having its center lug 32a connected via pivot 30c to the piston rod 30a of the cylinder 30 which itself is pivoted on the frame 1 at 30b. The cylinder 39 is of the single-acting type and is spring biased into the extended position shown in FIG. 13. In this relaxed, solid-line position the pivot 32b lies on an adjustable stop 33a below a plane T defined by pivot 33 and pivot 28b so that the linkage 31, 32 forms a toggle which will maintain the lever 23 erect to resist pressure against the lever 28. Actuation of the piston rod 30 sufficient to lift the point 32b above the plane T will alow the abutment 26 to push over the lever, under the effect of pressure transmitted through the carriage train from the cylinder 17. Thus the cylinders 30 and 17 are simultaneously pressurized and the cylinder 22 depressurized to advance the carriage train one step, with the pressure in cylinder 22 being allowed to build up again for even slowing-down of the train and with the cylinder 30 being depressurized again to cause the stop 28 to swing up. The upstream stop 27 automatically pivots over as an abutment 26 passes over it, then snaps up behind this abutment to block the train in the upstream direction.

As shown in FIGS. 1a and 1b the workpiece carriages are returned on the return track 3 by a belt 34 spanned between two driven wheels 35 and 36 and provided with upstanding arms 37 which engage behind the carriages 6 and push them along the track 3 from the unloading station A to the loading station E. The belt or chain 34 is driven continuously at a velocity such that there is always a carriage 6 ready to be loaded into the upstream transferrer 9. A cylinder 38 equipped with a bumper 39 works with the downstream transferrer 10 to push a carriage off the lower bars 16 and onto the track 3 where it can be caught and entrained by one of the arms 37. At the upstream end E a piston rod 40 carried on a vertical cylinder 44 serves to prevent travel of a carriage into the transferring device 9 except when the rod 40 is retracted downwardly. In addition a horizontally arranged cylinder 41 has a piston rod 42 carrying a dog 42 pivotal, as seen in FIG. 1a, clockwise only from the illustrated position and normally urged back into the illustrated position and normally urged back into the illustrated position by a torsion spring 43a. Once the transferrer 9 has turned over so that an empty pair of guide rods 15 or 16 is lined up with the lower track 3 the cylinder 44 is depressurized to unblock the waiting carriage 6 and the piston rod 42 is first retracted to pull the catch 43 back under the waiting carriage and then expanded to push this carriage 6 onto the waiting set of rods 15 or 16. Thereafter the piston rod 40 is again raised and the cylinder 14 is turned over to allow the piston rod 19 to push this carriage off onto the top guide track, during which operation, of course, another carriage may be loaded onto the lower empty track of the transferrer 9.

The cylinders 17, 22, 30, 38, 41, and 44 are centrally controlled by a programmer as will be described in reference to FIG. 15. They can be pneumatic or hydraulic, and are generally coupled to limit switches which in turn are connected to solenoid valves and the like. Of course it is possible to replace some or all of the cylinders by solenoids or motor arrangements so that no fluid power is used at all. The stop 40, for instance, could easily be the spring-loaded armature of such a solenoid.

As shown in FIG. 2a the workpieces 21 are treated by milling and grinding devices 45, 46 and 47, 48 which are mounted on the machine frame 1 and which coact with patterns 45a and 46a in a known manner to shape the edges of the workpieces. These devices travel longitudinally, that is, in the workpiece direction of travel, past the arrested workpieces to shape them. In addition transversely effective shapers such as a pair of saws 49 and 50 for shortening the workpieces as well as a borer 51 and a router 52 are provided also along the working path to further shape and prepare the workpieces 21 as they are advanced stepwise. Since the transversely effective devices and the longitudinally effective devices are arranged to opposite sides of the track 2, both sides of these workpieces 21 can be worked on simultaneously. The drives for the machines 45–52 are electric motors shown at 53–60 respectively. The longitudinally working machines 45–48 are mounted on a common carriage 61 controlled by a cylinder 62 extending parallel to the track 2 which serves to reciprocate them past the stopped workpieces. During return opposite to the transport direction the tools of the machines 45–48 are lifted from contact with the workpieces 21. Also during this return the clamps 63 holding the workpieces 21 on the furthest downstream carriage 6 are released and this workpiece is pushed off at the unloading end A and the entire workpiece train is advanced one step.

The charging apparatus for loading workpiece blanks onto carriages is shown in FIG. 3 and comprises a slider 145 carried on a beam 146 transverse to the workpiece direction of travel and reciprocal thereon by a fluid-operated cylinder 147. Each carriage has a bed or surface 154 onto which the workpieces are clamped by the clamps 63. The slider 145 has two fluid-operated lifting cylinders 148 whose piston rods 149 are vertical and each carry a mounting block 150 in which a vertical carrying rod 151 may slide. This rod 151 is provided with a horizontal pusher bar 152 provided with a catch 153 which pivots from its illustrated position only in the clockwise direction, like the dog 43, and is returned by a spring. A clamping screw 155 is provided on the body 150 in order to fix the bar vertically therein at a height dependent on the vertical height of the workpieces. These workpieces 21 are stored in a magazine 164, 165 which is open at the bottom. The lowermost workpiece always rests on a support 164a just above the level of the pusher 152. When the bar 152 is moved from left to right, as seen in FIG. 3, the bottommost workpiece 21 is slid horizontally out of the magazine and over the surface 154, whereupon the cylinders 148 are relaxed to drop this workpiece down onto the surface 154 and then the bar 152 is withdrawn, the dogs 153 pivoting over as they pass back under the stack of workpieces in the magazine.

The workpieces, once fully shaped, are unloaded from the apparatus at the station A by means of a pair of arms 136 carrying a slider 137 in turn provided with a pair of pushers 139 which engage the workpiece and, under the force exerted by a cylinder 138, push it off onto a tray 140. A conveyor 141 next to this tray receives the finished workpieces and carries them off to an assembly station.

It is necessary to turn the workpieces over after they have passed through shaping stations I–IV in order that longitudinally working devices 127–30 reciprocal by a cylinder 142 as well as transverse operators 131–133 may finish the workpiece. To this end the apparatus for turning over the workpieces shown in FIG. 2c generally and in detail in FIGS. 7–12 is provided at an inverting station W between stations V and VI in which working machines 134 and 135 are provided. The steps carried out by the machine are shown in FIG. 14.

As shown in FIGS. 7–12 the turning-over device comprises two parallel round rods 71 extending horizontally and normally to the track 2 and supporting a horizontally slidable support frame 72 equipped with sliding bushings 73 so that it may slide normal to the track 2. This frame 72 is displaced by means of a fluid-operated cylinder 68 which is mounted on the frame 1 and connected with the frame 72 through a coupling 70 on its piston rod 69. On ends of the transverse beam of the support frame 72 there is provided a support console 74. An axle 75 extending parallel to the track 2 is pivotal in this console but axially fixed therein and serves to support rockers 76 formed as lever arms which are spaced from each other with an eye 77 around the axle 75 and with an eye 78 tightly engaging around a rod 79 or the like. The rockers are fixed to the rod 79 by a pin 80. The arms 76 extend somewhat beyond the rod 79 and have on their free ends a bar 81 joining them together. A pneumatic or hydraulic lifting cylinder 82 is connected via a coupling eye 83 to the bar 81. The piston rod 84 of this cylinder 82 is connected by a coupling 85 with an eye 86 of the frame 72. Expansion or contraction of the cylinder moves the arms 76 up or down.

A pair of two-armed levers 87 are carried on these rocker arms 76. Sleeves mount these levers 87 on the pivot axis 75 and a guide bushing 89 permits longitudinal displacement on the rod 79 for each lever 87. Each lever 87 has a clamp 90 situated at the bushing 89 so as to clamp them on the rod 79 after proper spacing depending on workpiece length. An intermediate gear wheel 91 is mounted on each bushing 88, this wheel 91 being connected by a key 92 to the bushing 92 and to the axis 75 for joint rotation therewith so that the two gear wheels 91 are linked together. Each wheel 91 meshes on one side with a gear wheel 92 which is connected at its axis 93 with a pneumatic or hydraulic motor 94. On the other side each wheel 91 meshes with the rotating head 95 carried by its hub 96 on the short end of the two-arm lever 87. The gear wheel 92 mounted on the motor 94 carries two stops 97, 98 offset by 200° about its axis, with another 20° wide stop 99 being carried on the support so as to limit pivoting of this wheel 92 to exactly 180°. Since all of the gear wheels 91, 92, and 95 are of identical diameter they will all be able to turn through 180° only. Since both levers 87 are coupled together by the pivot axis 75, both heads 95 will rotate identically through 180°. Of course several such turning devices could be provided, each, for example, only turning the workpiece through 90°, in order to work more than two faces of a workpiece.

Each inverting head 95 has turned toward the workpiece a fork 100 (FIGS. 11 and 12) which is bored out to receive small-diameter end portions 101 of a fixed piston 103 whose piston rod 102 extends at right angles to the horizontal rotation axis for the head 95. A displaceable cylinder 104 is slidable on the piston 103 and is provided with a jaw 105 which coacts with another fixed jaw 106 carried on a support block 107, secured by means of a screw 108 engaging through a slot in the jaw 106. This lower jaw 106 is adjusted to lie just at the level of the support surface 154 for the workpiece 21 on the carriage 6.

Received coaxially in each head 95 is a conducting body 109 having a portion projecting from the lever 87 formed with three connections 110, 11, and 112 (FIGS. 9 and 10).

Connection 110 leads to an eccentric bore 113 in the body 109 which receives a longitudinally displaceable piston 114. This piston has a flat projection 115 turned toward the workpiece which is displaceable between the jaws 105 and 106 and which serves to straighten out a workpiece as it lies on the surface 154 by means of its narrow end. This narrow end 115 is formed with an elongated hole 116 coacting with a groove formed in the piston rod 102 acting as a guide for the projection 115 so that it comes into exact position against the workpiece. Two small rods 115a extend laterally from the end 115 and tension springs between them and the body 109 serve to pull the piston 114 back into the bore 113. This piston 114 serves to accurately align the workpiece between the two heads 95 before the jaws are closed on it. Pressurization of the core 113 serves to advance the piston to an extent proportional to the pressure to exactly line up the workpiece.

Both connections 111 and 112 communicate through respective passages 117 and 118 in the body 109 with circumferential canals 119 and 120 formed in the head 95 which are separated by a seal ring and in turn communicate through respective bores 121 and 124 and tubes 122 and 125 screwed into the cylinder 104 at 123 and 126 to pressurize the chambers 127 and 128 to either side of the piston 103. Thus the jaw 105 can be displaced in either direction relative to the jaw 106.

With reference to FIG. 14 the inverting mechanism W functions as follows:

I. At the start the workpiece 21 is clamped down by the retainer 63 on the surface 154 of the carriage 6. The jaws 105 and 106 are open and the heads 95 are spaced from the carriage 6.

II. The clamp 63 is released and the heads 95 are moved up to the workpiece by means of the cylinder 68.

III. The jaws 105 and 106 are closed on the workpiece 21 by pressurization of the chamber 127 and the workpiece is lifted off the surface 154 by the cylinder 82.

IV. Again the cylinder 68 is actuated to take the workpiece away from the carriage 21 and the motor 94 is operated to rotate it through 180° exactly.

V. The cylinder 68 returns the workpiece to above the carriage 6.

VI. The cylinder 82 lays the workpiece on the surface 154 again and the chamber 128 is pressurized to open the jaws 105 and 106.

VII. The heads 95 are withdrawn by the cylinders 68 and the motor 94 is operated again to return these heads to their original position.

The workpiece 21 is lined up on its carriage longitudinally by means of the bumpers 115 which operate between steps II and III outlined above. In addition lining-up transverse to the longitudinal or displacement direction is effected by bumpers 67 carried on a cylinder 66 mounted on the front of the inverter below the rod 75. Similar arrangements 156 and 157 are provided, as shown in FIG. 3, at the loading station E which are operated by cylinders 158 and 159 to line up the workpieces at the start. Each aligning cylinder 66 is mounted on a flange 65 of the frame 72 and is provided with a clamp 64 for locking it in position therealong.

Such aligning devices are arranged across from the loading device 145–152 (FIG. 3) as shown at 156 and 157.

FIG. 15 shows schematically the operating cycle of the apparatus. Arc a of the outer circle represents the period during which the various shaping, boring, milling, sanding, and similar devices work on the workpieces. During the period indicated by arc b the retaining devices 28–33 are released to prepare the entire carriage train for displacement. In time c the advance cylinder 17 is actuated to push the entire train along by one carriage length. Finally during the period of arc d the cylinder 30 is pressurized to again block the train of carriages.

It should be clear from the above that by far the greatest amount of time is spent actually working on the pieces of wood. Approximately 25 percent of the time is spent displacing the carriages, returning the tools to their starting positions, and the like.

Arc *e* shows how long it takes, relative to the other operations, for the devices at the ends of the working paths to change a carriage from one guide track to the other. Arc *f* is the time required to set a workpiece blank into the furthest upstream carriage and arc *g* shows how long it takes to invert a workpiece with the arrangement of FIGS. 7–12. Finally arc *h* shows how long it takes to move an empty carriage from one end of the track 3 to the other, in order to keep the upstream transfer device 9 supplied.

Since once a program and operating cycle is established for the apparatus all the operator need do is keep the magazine 164, 165 for workpiece blanks full, the machine is simple in the extreme. All of these workpieces are always worked on as they lay firmly clamped to solid bases so that an extremely high-quality product is obtained.

I claim:

1. An apparatus for shaping a succession of workpieces, said apparatus comprising:
    an elongated working track having an upstream end and a downstream end;
    a plurality of carriages displaceable along said working track;
    means for advancing said carriages stepwise as a train along said working track from said upstream end to said downstream end with each carriage abutting at least one other carriage;
    a plurality of shaping machines spaced along said working track intermediate said ends;
    means at said upstream end of said working track for laying a workpiece on a carriage at that end;
    means at said downstream end of said working track for removing a shaped workpiece from a carriage at that end;
    clamp means on each of said carriages for retaining a workpiece thereon;
    an elongated return track extending along said working track between said ends;
    means for displacing said carriages along said return track from said downstream end of said working track to the upstream end thereof;
    means at the ends of said tracks for transferring a carriage from one of said tracks to the other of said tracks, said tracks being each a pair of parallel rods, said carriages riding on said rods, said means for transferring including a rotatable body at each end of said tracks, each body having two pairs of storing rods simultaneously alignable with both of said tracks, whereby a carriage may ride off one track onto the storing rods of said body, and means for rotating said body and bringing each of its pairs of storing rods into alignment with either track.

2. The apparatus defined in claim 1, further comprising means along said working track intermediate said ends for inverting a workpiece.

3. The apparatus defined in claim 2 wherein the inverting means includes a pair of arms each having a rotatable head, means on said head for grasping a workpiece, means for lifting said arms with the grasped workpiece, and means for rotating heads through 180° with the lifted grasped workpiece thereby inverting said workpiece.

4. The apparatus defined in claim 3, further comprising means for advancing said arms up to said workpiece from a position alongside said working track.

5. The apparatus defined in claim 1 wherein said means for transferring further comprises means for turning over the carriages.

6. The apparatus defined in claim 5, further comprising fluid-operated cylinder means for pushing a workpiece off said body and onto one of said tracks.

7. The apparatus defined in claim 1, further comprising means for maintaining all of said carriages on said working track in snug contact with one another.

8. The apparatus defined in claim 9 wherein said means for maintaining snug contact between said carriages includes a stop at said downstream end and a stop at said upstream end, and means for operating said stop at said downstream end.

9. An apparatus for shaping a succession of elongated wooden workpieces, said apparatus comprising:
    an elongated working track having an upstream end and a downstream end;
    a plurality of elongated carriages displaceable along said working track in end-to-end contiguous relationship whereby said carriage forms a longitudinally rigid train extending along said track;
    a plurality of wood-shaping machines spaced along said working track intermediate said ends and including means shiftable parallel to said track for imparting longitudinal contours to a workpiece on a carriage disposed opposite one of said machines in accordance with a template, said carriages each being provided with longitudinally spaced clamps for retaining a respective elongated wooden workpiece thereon;
    a return track below said working track and extending from said downstream end to said upstream end;
    a conveyor engageable with carriages on said return track for displacing same independently of the carriages on said working track;
    means for advancing said carriages on said working track intermittently;
    means at said upstream end for elevating a carriage returned by said return track to the plane of said working track;
    means at said upstream end for feeding individual workpieces onto carriages returned to said working track;
    means at said downstream end for lowering carriages from said working track onto said return track; and
    means at said downstream end for removing workpieces from the carriages on said working track.

10. The apparatus defined in claim 9, further comprising means along said working track intermediate said ends for inverting said workpiece, the inverting means including a pair of arms each having a rotatable head and adapted to straddle the ends of a workpiece juxtaposed therewith; means on each head for grasping a workpiece; means for lifting the arms with the workpiece grasped therebetween; and means for rotating said heads through 180° with the workpiece grasped therebetween to invert the workpiece.

11. The apparatus defined in claim 9 wherein the means for lowering said carriages at said downstream end for displacement along said return track includes means for turning the carriages over.

* * * * *